(12) United States Patent
Muster et al.

(10) Patent No.: US 11,035,536 B2
(45) Date of Patent: Jun. 15, 2021

(54) ILLUMINATION DEVICE FOR EMITTING ILLUMINATION LIGHT

(71) Applicant: OSRAM GmbH, Munich (DE)

(72) Inventors: Jasmin Muster, Heidenheim (DE); Ricarda Schoemer, Zusmarshausen (DE); Jenny Trommer, Oberkochen (DE); Oliver Hering, Niederstotzingen (DE); Jürgen Hager, Herbrechtingen (DE)

(73) Assignee: OSRAM BETEILIGUNGSVERWALTUNG GMBH, Grunwald (DE)

(*) Notice: Subject to any disclaimer, the term of this patent is extended or adjusted under 35 U.S.C. 154(b) by 173 days.

(21) Appl. No.: 16/074,444

(22) PCT Filed: Dec. 2, 2016

(86) PCT No.: PCT/EP2016/079558
§ 371 (c)(1),
(2) Date: Aug. 1, 2018

(87) PCT Pub. No.: WO2017/133809
PCT Pub. Date: Aug. 10, 2017

(65) Prior Publication Data
US 2019/0032878 A1    Jan. 31, 2019

(30) Foreign Application Priority Data

Feb. 3, 2016 (DE) .......................... 102016201606.7

(51) Int. Cl.
*F21S 41/141* (2018.01)
*F21S 41/14* (2018.01)
(Continued)

(52) U.S. Cl.
CPC .............. *F21S 41/141* (2018.01); *B60Q 1/04* (2013.01); *F21S 41/16* (2018.01); *F21S 41/176* (2018.01);
(Continued)

(58) Field of Classification Search
None
See application file for complete search history.

(56) References Cited

U.S. PATENT DOCUMENTS

2011/0249460 A1    10/2011  Kushimoto
2012/0106178 A1*    5/2012  Takahashi ............... F21S 41/14
                                                   362/459

(Continued)

FOREIGN PATENT DOCUMENTS

DE    102014213179 A1    1/2015
DE    102015222188 B3    11/2016
(Continued)

OTHER PUBLICATIONS

German Search Report based on application No. 102016201606.7 (7 pages) dated Sep. 20, 2016 (Reference Purpose Only).
(Continued)

*Primary Examiner* — Mary Ellen Bowman
(74) *Attorney, Agent, or Firm* — Viering, Jentschura & Partner mbB

(57) ABSTRACT

An illumination device for emitting illumination light, comprising: a light-emitting diode (LED) for emitting LED radiation, a laser for emitting laser radiation, and a luminescent element for at least partial conversion of the LED radiation and the laser radiation into conversion light, which forms at least part of the illumination light. The LED, the laser and the luminescent element are arranged relative to one another in such a way that during operation of the illumination device, on an incidence face of the luminescent
(Continued)

element, respectively in a time integral, the LED irradiates an LED irradiation area with the LED radiation and the laser irradiates a laser irradiation area with the laser radiation. The laser irradiation area has at least one intersection with the LED irradiation area.

25 Claims, 3 Drawing Sheets

(51) Int. Cl.
  *F21S 41/16* (2018.01)
  *F21S 41/176* (2018.01)
  *B60Q 1/04* (2006.01)
  *F21Y 115/30* (2016.01)
  *F21Y 115/10* (2016.01)
  *F21Y 113/00* (2016.01)

(52) U.S. Cl.
  CPC .......... *F21S 41/18* (2018.01); *F21Y 2113/00* (2013.01); *F21Y 2115/10* (2016.08); *F21Y 2115/30* (2016.08)

(56) References Cited

U.S. PATENT DOCUMENTS

| | | | |
|---|---|---|---|
| 2012/0236536 A1* | 9/2012 | Harada | F21S 41/143 362/84 |
| 2014/0185307 A1* | 7/2014 | Lee | B60Q 1/10 362/465 |
| 2014/0321151 A1 | 10/2014 | Sato et al. | |
| 2016/0146419 A1* | 5/2016 | Reinprecht | F21S 41/143 362/512 |
| 2016/0201880 A1* | 7/2016 | Park | F21S 41/16 362/84 |

FOREIGN PATENT DOCUMENTS

| | | |
|---|---|---|
| EP | 2487407 A2 | 8/2012 |
| EP | 2525140 A2 | 11/2012 |
| EP | 2829790 A2 | 1/2015 |
| WO | 2014205466 A1 | 12/2014 |

OTHER PUBLICATIONS

International Search Report based on application No. PCT/EP2016/079558 (12 pages) dated Feb. 6, 2017 (Reference Purpose Only).

* cited by examiner

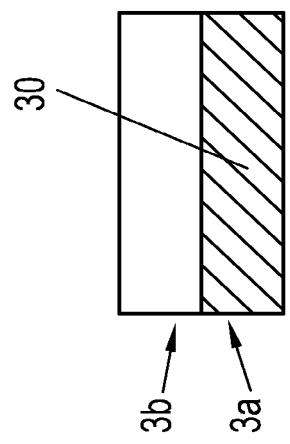
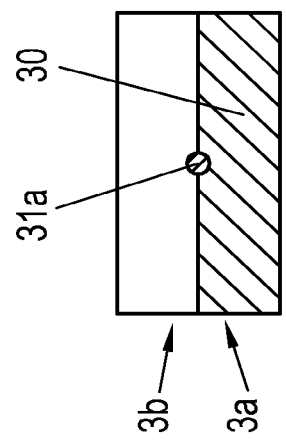
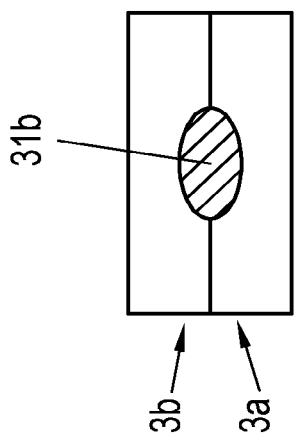
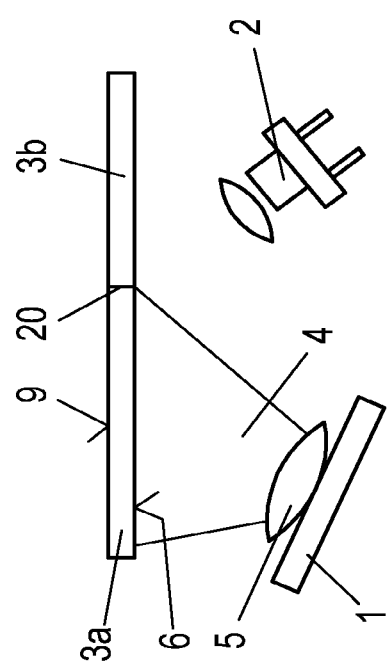
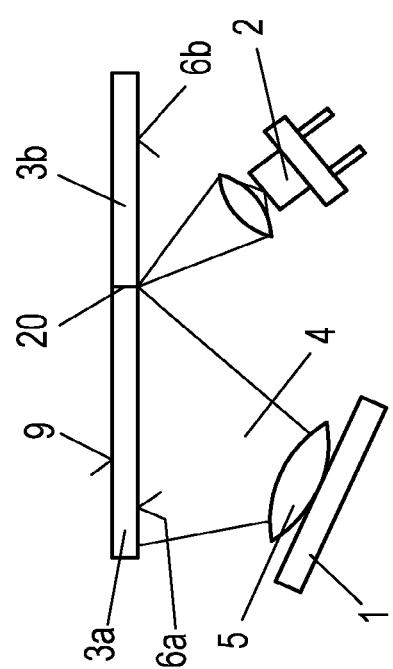
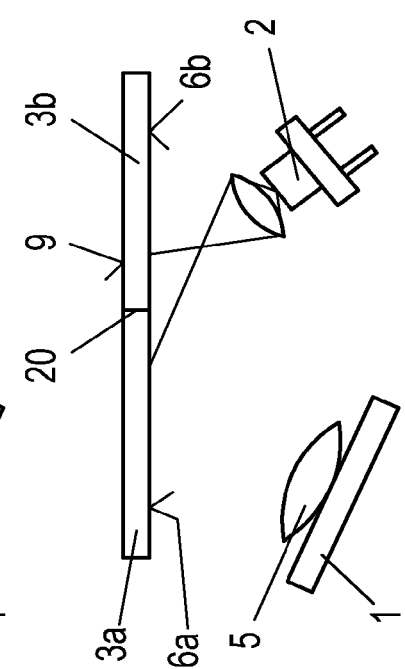

ILLUMINATION DEVICE FOR EMITTING ILLUMINATION LIGHT

CROSS-REFERENCE TO RELATED APPLICATION

The present application is a national stage entry according to 35 U.S.C. § 371 of PCT application No.: PCT/EP2016/079558 filed on Dec. 2, 2016, which claims priority from German Patent Application Serial No.: 10 2016 201 606.7 which was filed Feb. 3, 2016, and is incorporated herein by reference in its entirety and for all purposes.

TECHNICAL FIELD

The present description relates to an illumination device for emitting illumination light, which includes a luminescent element.

BACKGROUND

In illumination devices of the type relevant here, a luminescent element is irradiated with pump radiation. The luminescent element converts the pump radiation into conversion light, which then forms at least part of the illumination light emitted by the illumination device. In the case of so-called partial conversion, the conversion light together with an unconverted fraction of pump radiation may form the illumination light, in which case, for example, blue pump light may then be advantageous as pump radiation. On the other hand, however, the conversion light alone may also form the illumination light (full conversion).

SUMMARY

The present description is based on the technical problem of providing a particularly advantageous illumination device.

This object may be achieved by an illumination device for emitting illumination light, having an LED for emitting LED radiation, a laser for emitting laser radiation, and a luminescent element for at least partial conversion of the LED radiation and the laser radiation into conversion light, which forms at least part of the illumination light, wherein the LED, the laser and the luminescent element are arranged relative to one another in such a way that during operation of the illumination device, on an incidence face of the luminescent element, respectively in a time integral, the LED irradiates an LED irradiation area with the LED radiation and the laser irradiates a laser irradiation area with the laser radiation, wherein the laser irradiation area has at least one intersection with the LED irradiation area.

Non-limiting embodiments may be found in the dependent claims and the disclosure overall, distinction not always being made in the description in detail between method and device or use aspects; in any event, the disclosure is to be interpreted implicitly in respect of all claim categories.

A basic idea in the present case is to provide not just one but at least two pump radiation sources, and specifically, with the LED and the laser, two pump radiation sources of different types. The LED radiation is typically emitted by the LED Lambertianally, i.e. entirely filling a half-space, but in any event with a wide angle; in contrast, the laser radiation is tightly collimated, and the ray bundle is sharply delimited. The LED may then, for example, be used for large-area basic illumination of the incidence face, onto which a local increase may be modulated with the laser. In principle, the amount of conversion light emitted by the luminescent element from a respective surface region (an emission face) correlates with the amount of the amount of pump radiation (LED radiation and/or laser radiation) incident in a corresponding surface region (an incidence face), i.e. a corresponding emission pattern is generated with an incidence pattern. The emission face of the luminescent element may be assigned illumination optics (imaging or non-imaging), which then deviate the illumination light emitted at different positions of the emission face into different spatial directions.

As a result, for example, with the large-area basic illumination a large angle range may thus be provided with illumination light, and with the local increase a super-proportional amount of light may be delivered to a narrow angle range; one application area of interest may, for example, be in the field of road illumination with a motor vehicle front headlamp, see below in detail. This is intended to illustrate a possibility opened up by the invention, but not to restrict the concept of the invention in its generality. Further application possibilities may be illumination devices, as a non-limiting example floodlights for architectural illumination, effect illumination, underwater illumination, signal lights, ship searchlights, and studio illumination.

The laser irradiation area and the LED irradiation area have at least one intersection, i.e. they overlap. Since a laser irradiation region, i.e. the entire region of the incidence face irradiated with the laser radiation at a respective instant (snapshot), may be varied during operation of the illumination device (for example the incidence face may be scanned with the laser radiation) and/or an LED irradiation region, i.e. the entire region irradiated with the LED radiation at a respective instant (snapshot), may be variable, the respective irradiation area is considered as a time integral. The LED irradiation area is thus given as the union of all LED irradiation regions irradiated over operation of the illumination device; likewise, the laser irradiation area is given as the union of all laser irradiation regions. In other words, a respective irradiation area is the area irradiated in total with the respective radiation over operation.

In general, the LED radiation and the laser radiation thus need not necessarily in fact overlap on the incidence face at an instant, but rather the overlap occurs at least as a time integral. A corresponding time offset may in this case, for example, lie below the limit of human perception, so that in perception-related averaging, for example, the wide and the comparatively narrow angle range are nevertheless provided "simultaneously" with illumination light according to the comments above.

The irradiation of the incidence face with LED radiation and laser radiation may, for example, also be carried out alternately during operation of the illumination device, for instance entirely separately in terms of time (not simultaneously at any instant); however, a partial but not full overlap (in the course of time) is for example also possible, so that there are instants at which irradiation is carried out simultaneously with LED radiation and laser radiation, and other instants at which radiation is respectively carried out with only one of the two. Also, in general, the LED radiation and/or laser radiation may strike the incidence face in a pulsed fashion, so that for example the respective average power may also be adjusted. If both are pulsed, they may for example differ in their frequency (of the pulses) and/or their duty factor.

In general, a respective irradiation region/a respective irradiation area may be determined according to the full width at half maximum, and the region/the face on the incidence face thus extends to where the radiation power (of the respective radiation) has fallen to one half (in general, the edge may for example also be placed where the radiation power has fallen to 1/e or 1/e²). Even though the present main claim specifies an overlap of the irradiation areas, in general LED and laser irradiation areas may also lie next to one another on the incidence face, and may touch or not touch; such a variant is explicitly intended to be disclosed as an alternative to the subject-matter of the main claim. Furthermore, it would in general also be conceivable to shine LED radiation and laser radiation not onto the same incidence face, but for example onto mutually opposite side faces of the luminescent element.

Apart from the sharp collimation, the laser radiation may be distinguished in particular by a high intensity or a long coherence length; both the laser radiation and the LED radiation may lie respectively in a narrow frequency range, and the radiation is thus respectively monochromatic. The terms "LED" and "laser" may respectively also be interpreted in terms of an arrangement (an array) having a plurality of individual LEDs/individual laser sources; "a plurality" means at least two, at least three or at least four being further lower limits (and at most 100, 80, 60, 40, 20 or 10 may be upper limits independently thereof).

The luminescent element is operated in transmission, i.e. the incidence face and the emission face lie opposite one another (although the emission pattern on the emission face and the incidence pattern on the incidence face are essentially congruent). In general, however, operation in reflection would also be possible, i.e. the incidence face and the emission face may also coincide (and the opposite side face of the luminescent element may then, for example, be mirrored). In general, dichroic mirroring may be provided on the incidence face and/or the emission face, for example for operation in transmission a coating which is reflective for the conversion light/transmissive for the pump radiation on the incidence face and/or a coating which is transmissive for the conversion light/reflective for the pump radiation on the emission face.

The conversion may be down-conversion, i.e. the conversion light has a longer wavelength (lower energy) compared with the laser radiation/LED radiation.

In one non-limiting embodiment, the laser irradiation area is a subset of the LED irradiation area, i.e. it lies fully on the latter. The laser irradiation area may be a proper subset of the LED irradiation area, i.e. the two are not congruent, but instead the laser irradiation area is smaller. When the size of an irradiation area/of an irradiation region is referred to in general, this is based on its area actually occupied on the incidence face, taking into account a possible topography of the incidence face; the incidence face may be planar, and the irradiation areas/irradiation regions are therefore also planar.

In one non-limiting configuration, the laser irradiation area has an area which constitutes at most 40%, in this order increasingly may be at most 35%, 30%, 25%, 20%, 15%, 10% or 5%, of the area of the LED irradiation area. Possible lower limits may, for example, be at least 0.5% or at least 1% (and may in general also be of interest independently of an upper limit).

In one non-limiting embodiment, the LED irradiation area has an area which constitutes at least 40%, may be at least 45%, particularly may be at least 50%, of an area of the LED irradiation area. At least half of the incidence face is thus irradiated with LED radiation. The "incidence face" is that side face of the luminescent element which contains the irradiation areas, but is itself not necessarily irradiated in its entirety; at an edge (for example cylindrical luminescent element) or at edges (for example cuboid luminescent element), it adjoins the edge face (cylinder lateral face) or edge faces (side faces of the cuboid) of the luminescent element. The incidence face may be planar.

In one non-limiting embodiment, the illumination device is configured in such a way that, during operation, the incidence face is at least temporarily irradiated simultaneously by the LED and the laser. In another operating state, the incidence face may in this case also be irradiated only with either the LED radiation or the laser radiation, although there should be at least one operating state with simultaneous irradiation. When in general the illumination device is referred to as being "configured" for particular operation, this means, if there is only a single operating state, that the relative arrangement of the LED, laser and luminescent element (and any means for beam guiding, for example lenses/mirrors) is such that, when the illumination device is switched on, corresponding irradiation takes place; if there are a plurality of operating states, a corresponding control unit may for example be provided, which correspondingly changes the irradiation from one operating state to the other, for example by adapting the output power of the LED and/or of the laser. An "operating state" is referred to when at least one of the sources (LED and laser) is emitting radiation.

In one non-limiting configuration, the illumination device is configured in such a way that the incidence face is not only irradiated simultaneously by LED and laser, but there is in fact also an overlap of LED and laser radiation on the incidence face at a respective instant. The laser and LED irradiation regions may be respectively static at least during the simultaneous irradiation of the incidence face, i.e. during this none of the irradiation regions moves over the incidence face and/or changes in its shape/size.

In one non-limiting embodiment, the illumination device is configured for operation in at least two operating states, the laser irradiation region having a first area (which is not equal to zero) in a first of the operating states, and in a second of the operating states has a second area which is greater than the first area. As already explained, "irradiation region" refers to the area irradiated at an instant, i.e. to a snapshot; the "irradiation area" is given, integrated over the operation, as the union of the irradiation regions (in the case of a static arrangement, the irradiation region and the irradiation area coincide, i.e. they are congruent).

The area of the laser irradiation region may, in the second operating state, for example be at least 20%, in the order mentioned may be at least 50%, 75%, 100%, 150%, 200%, 250%, 300%, 350%, 400%, 450%, or 500%, greater than in the first operating state; possible upper limits may (independently thereof) for example be at most 5000%, 3000% or 1000%. In the first operating state (small region), for example a high-beam mode of the motor vehicle headlamp may be at least assisted, and/or in the second operating state (large region) a daytime running mode may be at least assisted, see below in detail.

In one non-limiting configuration, the first and the second operating states are adjusted, i.e. the size of the laser irradiation region is varied, by varying the relative distance of the laser and the luminescent element. In conjunction with a divergent or convergent, i.e. non-collimated, laser beam, the size of the laser irradiation region is also changed with the distance change. The laser radiation may strike the incidence face divergently, and is thus smaller in the first operating state (smaller region) than in the second operating state, according to the relative distance. The changing of the relative distance may generally be carried out with, as a non-limiting example, a linear motor.

As an alternative to varying the relative distance between the incidence face and the laser, or also in combination therewith, in order to vary the size of the laser irradiation region it is also possible to move an optical element, by means of which the laser radiation is guided, for example a lens through which the laser radiation passes.

In one non-limiting embodiment, a surface centroid of the laser irradiation region is positionally invariant, specifically over operation of the illumination device, i.e. for example even in different operating states. The purely geometrical area is used as a basis for determining the surface centroid, i.e. this is for example, not weighted with the irradiation strength. In spite of the positionally invariant surface centroid, in general a size and/or shape change of the laser irradiation region is still possible, i.e. for example a change as just described between a first and a second operating state.

In one non-limiting embodiment, the laser radiation is guided onto the incidence face of the luminescent element in such a way that it is incident with a centroid direction which is tilted relative to a perpendicular to the incidence face. "Tilted" may for example mean tilted by at least 5°, 15°, 25°, 35° or 45° (increasingly may be in the order mentioned), and independently thereof for instance tilted by not more than 80°, 70° or 60°. The incidence is thus oblique, which may for example offer arrangement-related advantages; then, for example, the LED for the relatively large-area LED irradiation may face toward the incidence face, and be placed relatively close thereto, and the laser radiation may be guided past the LED onto the incidence face. The "centroid direction" is taken as the average value of all direction vectors of the ray bundle of the radiation respectively considered (laser radiation or LED radiation), each direction vector being weighted with the beam strength associated with it for this averaging. The perpendicular is generally taken as the perpendicular onto a planar compensation face placed in the incidence face; the incidence face may be planar and the perpendicular is placed at a right angle on the entire incidence face.

LED radiation guided obliquely onto the incidence face may also be advantageous, either in combination with the obliquely delivered laser radiation or independently. The centroid direction, with which the LED radiation strikes the incidence face, is thus then tilted relative to the perpendicular on the incidence face, cf. the definitions and angle specifications above.

In one non-limiting embodiment, a mechanically mobile shutter is provided, which partially masks, i.e. reduces, the LED irradiation region in a closed position of the shutter. Correspondingly, the area of the LED irradiation region is greater in an open position of the shutter than in the closed position. In other words, a shutter is provided which limits the LED irradiation region in the closed position and increases it in the open position. The LED radiation may be no longer limited at all by the shutter in the open position, but rather the shutter is removed fully from the beam path.

A configuration may be such that the shutter additionally blocks the path of the laser radiation to the incidence face in the closed position. This may also be of interest even when the laser is not being operated at all in the closed position, for example as an additional safety device. In the open position, the shutter may then not only transmit a previously blocked part of the LED radiation, but specifically may also open the path for the laser radiation.

In one non-limiting configuration, the incidence face of the luminescent element is subdivided into a multiplicity of regions arranged next to one another, with different conversion properties. The regions may, when looking perpendicularly onto the incidence face, for example be arranged next to one another (in a row or column) or in the form of a matrix, i.e. in rows and columns. In general, the different conversion properties could, for example, also be achieved by a different thickness of the regions, measured perpendicularly to the incidence face; however, the luminescent material may differ, i.e. as a non-limiting example in the case of a luminescent element material composed of a plurality of individual luminescent components, their relative proportions in the individual regions may be different and/or regions may differ in respectively at least one individual luminescent component. Furthermore, in the case of the same individual luminescent component(s) their concentration may be different. In general, the luminescent element may, for example, also be constructed from a plurality of layers placed on one another in the thickness direction (see below), and in the case of subdivision into regions arranged next to one another these then need not necessarily differ in all layers, but in at least one layer of the layer stack.

In general, in a luminescent element subdivided into neighboring regions, the nearest-neighbor regions may respectively also adjoin one another directly. The regions may, however, also in fact be physically separated from one another, for example by a wall arranged between them or a metal plate, for instance a thin steel plate. In general terms, the regions may thus be separated from one another by means of a non-converting boundary material between them. The subdivision into regions, in particular into regions physically separated from one another, may for example be of interest insofar as sharply delimited illumination light emission may be possible; it may therefore be of interest in general even independently of different conversion properties in the regions. The "multiplicity" of regions means at least two, advantageously at least three regions, and possible wherein upper limits may for example be at most ten or five regions.

The subdivision of the luminescent element extends in a thickness direction (which is parallel to the perpendicular discussed above) through the entire luminescent element, particularly advantageously exclusively in the thickness direction (not obliquely). In a luminescent element operated in transmission, for example the opposite emission face is then thus subdivided congruently to the incidence face. Even though the luminescent element may thus be subdivided into volume regions by the subdivision of the incidence face into regions, it nevertheless may be in one piece overall, and the individual regions thus cannot be separated from one another nondestructively. In general, a one-piece luminescent element is advantageous; in the case of configurations other than those just described, it may advantageously be monolithic (apart from statistically distributed constituents, it is free of material boundaries in its interior).

The description also relates to a motor vehicle headlamp (MV headlamp) having an illumination device as described here, advantageously a front headlamp and/or an automobile headlamp.

In one non-limiting configuration, the motor vehicle headlamp is configured in such a way that the LED irradiation area is irradiated with the LED radiation both in a low-beam mode and in a high-beam mode. In this case, the size and/or shape of the LED irradiation region may differ in the low-beam and high-beam modes, and the LED irradiation region may thus, for example, be greater in the high-beam mode. The size and/or shape of the LED irradiation region may, however, also be identical in the low-beam and high-beam modes. In the high-beam mode, irradiation may in any event be carried out additionally with the laser radiation. As described in the introduction, a relatively narrowly limited range may be excited with a comparatively high intensity with the laser radiation, and correspondingly a large amount of illumination light may then also (with illumination optics) be guided in a relatively small solid angle range. With a correspondingly narrow light cone, the road in the distance may then be illuminated well.

In one non-limiting embodiment, the motor vehicle headlamp has an illumination device as described here with a first and a second operating state (different size of the laser irradiation region), in the first operating state (small laser irradiation region), a high-beam mode of the headlamp being at least assisted and/or in the second operating state (large laser irradiation region), a daytime running mode of the headlamp being at least assisted. Particularly in the daylight running mode, in addition to the emission from the (large) laser irradiation region, a further illumination component of the motor vehicle headlamp may then also be activated, for example an LED strip, i.e. LEDs arranged next to one another, optionally in conjunction with non-imaging optics for beam guiding.

In one non-limiting embodiment, the motor vehicle headlamp has an illumination device as described here with a mechanical shutter, the headlamp being switched into a low-beam mode in the closed position (shutter masks LED irradiation region) and being switched into a high-beam mode in the open position. In the high-beam mode, the laser radiation may then additionally strike the incidence face, cf. the description above.

The description also relates to the use of an illumination device as described here for a corresponding motor vehicle headlamp.

In general, the at least one "LED" may include at least one light-emitting diode. When there are a plurality of light-emitting diodes, they may shine in the same color or in different colors. A color may be monochromatic (for example red, green, blue, etc.) or polychromatic (for example white). A plurality of light-emitting diodes may generate mixed light; for example blue mixed light. The at least one light-emitting diode may contain at least one light wavelength-converting luminescent material (conversion LED). The at least one light-emitting diode may be in the form of at least one individually packaged light-emitting diode or in the form of at least one LED chip. A plurality of LED chips may be mounted on a common substrate ("submount"). Instead of or in addition to inorganic light-emitting diodes, for example based on InGaN or AlInGaP, it is generally also possible to use organic LEDs (OLEDs, for example polymer OLEDs).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIGS. 2A-C show a second illumination device according to the description in different operating states;

FIGS. 3A-C show the irradiation of the incidence face of the luminescent element according to FIGS. 2A-C in plan view;

DETAILED DESCRIPTION

Figure 1:
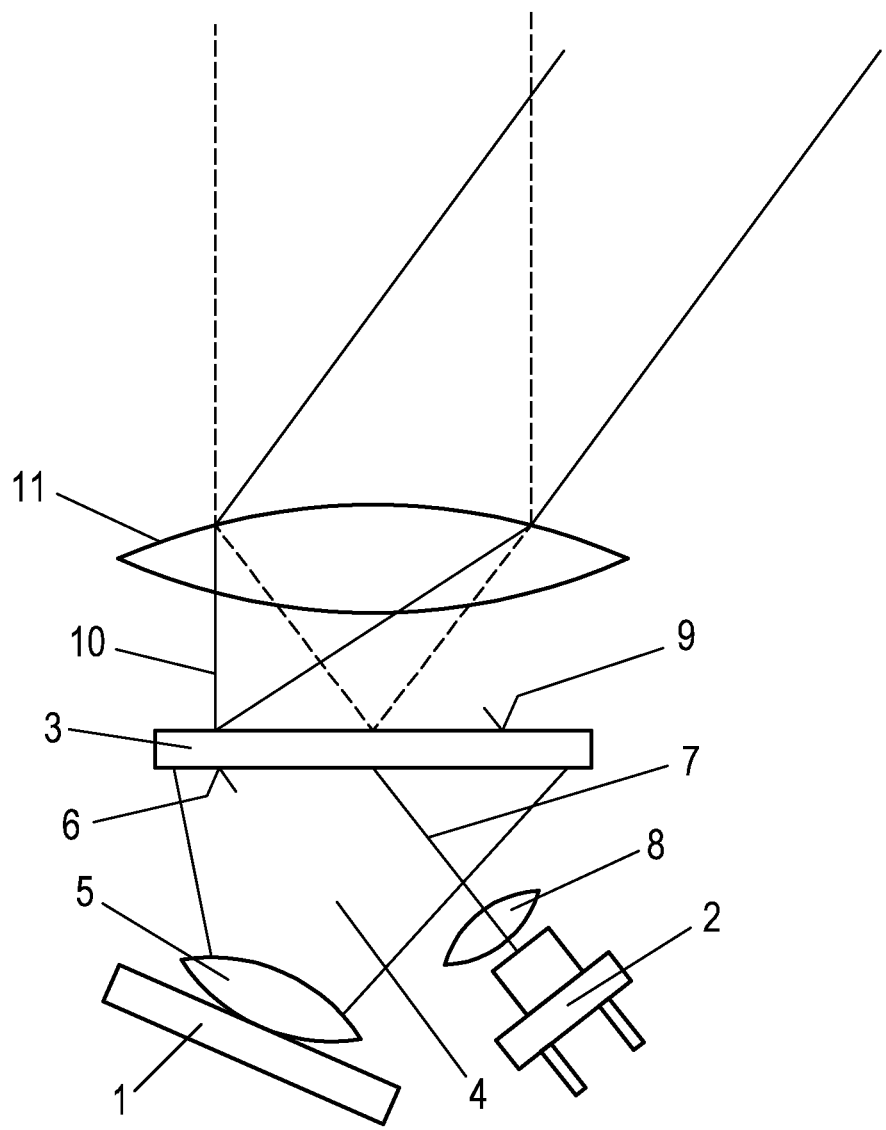
FIG. 1 shows a first illumination device according to the description having an LED, laser and luminescent element.

FIG. 1 shows a first illumination device according to the description with an LED 1 (cf. the definition in the introduction to the description), a laser 2, namely a laser diode, and a luminescent element 3. A schematic side or sectional view is shown. The LED 1 emits LED radiation 4, which passes through primary optics 5 for ray bundle shaping and then strikes an incidence face 6 of the luminescent element 3. By the primary optics 5, the aperture angle of the original Lambertianally emitted LED radiation 4 is reduced somewhat.

Likewise for irradiation of the incidence face 6, the laser 2 emits laser radiation 7, which passes through a collimation lens and then strikes the incidence face 6 of the luminescent element 3 while being essentially collimated, and irradiates a substantially smaller region of this face than the LED radiation 4.

Both the laser radiation and the LED radiation are blue light, a fraction of which is converted into yellow conversion light by the luminescent element 3, in the present case made of yttrium aluminum garnet (YAG:Ce). However, not all of the blue light is converted, so that a mixture of yellow conversion light and partially unconverted blue light is emitted as illumination light 10 at an emission face 9, opposite the incidence face 6, of the luminescent element 3.

By way of non-limiting example, two ray bundles of this illumination light 10 are represented which emerge from different positions of the emission face 9 and are deviated by illumination optics 11 into different spatial directions. If the illumination device is then installed in a motor vehicle headlamp, how much illumination light 10 is emitted from which position of the emission face 9 determines how much illumination light 10 reaches which spatial direction, and correspondingly which region on or at the road. By the large-area irradiation of the incidence face with the LED radiation 4, for example, wide-angle basic illumination may be carried out, on which a local increase is superimposed with the spatially concentrated laser radiation 7. A relatively narrow central solid angle range is correspondingly provided with a particularly large amount of illumination light 10.

FIGS. 2A-C show a second illumination device, which is for the most part constructed in a comparable way to that according to FIG. 1, specifically in three different operating states. In general, in the scope of this disclosure references which are the same refer to parts which have the same function, and to this extent reference is always made to the description regarding the other figures. In the case of the illumination device according to FIGS. 2A-C, in a comparable way to FIG. 1, illumination optics for extracting the illumination light emitted at different positions of the emission face 9 of the luminescent element 3 are provided, although these optics are not represented for the sake of clarity.

The luminescent element 3 according to FIGS. 2A to C is subdivided by a thin steel plate 20 into two regions 3a,b, which differ in their conversion properties (although this is not necessary in general), and correspondingly the incidence face 6 is also segmented into two regions 6a,b.

In the operating state according to FIG. 2A, only the LED 1 is operated, only the region 6a of the incidence face 6 being irradiated with the LED radiation 4. The segmentation by the steel plate 20 may, for example, also be advantageous insofar as a clearly defined LED irradiation region 30 may be achieved, cf. the hatched area in FIG. 3A. Since the relative arrangement of the LED 1, primary optics 5 and luminescent element 3 is static in the present case, and there is no masking of the LED radiation 4, in the exemplary embodiment according to FIG. 2 the LED irradiation region 30 corresponds to the LED irradiation area irradiated as a time integral.

In general, FIGS. 3A-C show the incidence face 6 of the illumination device according to FIGS. 2A-C respectively in plan view, the same letters A, B, C respectively referencing the same operating state.

In the operating state according to FIG. 2B, in addition to the irradiation of the region 6a of the incidence face 6 with the LED radiation 4, a relatively small region thereof is also irradiated with the laser radiation 7, i.e. the laser 2 is activated. FIG. 3B illustrates the small laser irradiation region 31a, which is superimposed on the LED irradiation region 30. In this small region, the radiation intensity put in is relatively high, for which reason a correspondingly large amount of conversion light is generated.

Correspondingly, a large amount of illumination light (conversion light with partially unconverted laser radiation) is then emitted at the emission face 9 through the illumination optics (not represented) in a narrow solid angle range. In a motor vehicle headlamp, the operating state according to FIGS. 2A/3A corresponds to a low-beam mode, while the operating state according to FIGS. 2B/3B corresponds to a high-beam mode.

In the operating state according to FIG. 2C, the LED radiation 4 is switched off, i.e. the LED 1 is inactive. The incidence face 6 is irradiated only by the laser radiation 7, wherein in contrast to FIG. 2B the laser irradiation region 31b is significantly larger, cf. FIG. 3C for illustration. This is achieved by an increased relative distance between the incidence face 6 and the laser 2, which because of the laser radiation 7 striking the incidence face 6 divergently leads to a laser irradiation region 31b which is modified in size. In the operating state according to FIGS. 2C/3C, the illumination device may assist a daytime running mode of the motor vehicle headlamp (in which it emits light in total from an area of at least 25 cm²).

In the operating state according to FIG. 2C, the laser radiation 7 strikes the incidence face 6 not only more widely, but also obliquely. Consequently, the effective optical path to the opposite emission face 9 in the region 3b of the luminescent element is shorter than in the region 3a. This may be taken into account by the slightly different conversion properties, so that as a result the ratio of unconverted laser radiation to conversion light in the two regions 3a,b is approximately the same despite the different optical path, i.e. comparable white illumination light is emitted.

Figure 5A:
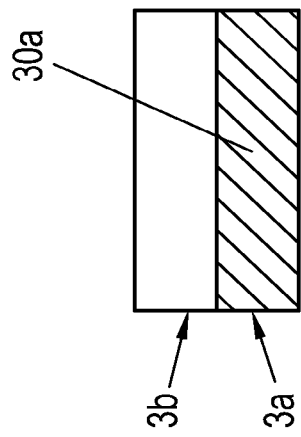
FIG. 5A,B shows the irradiation of the incidence face of the luminescent element according to FIGS. 4A and B in plan view.
Figure 4A:
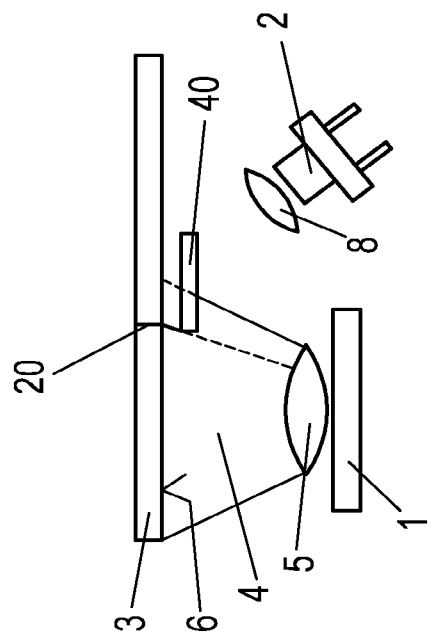
FIGS. 4A,B show a third illumination device according to the description in two different operating states.

In the illumination device according to FIGS. 4A,B, in addition to the basic structure with the LED 1 and laser 2, a mobile shutter 40 is provided. FIG. 4A shows the shutter 40 in a closed position, and FIG. 4B in an open position. In the closed position, the shutter 40 masks the LED radiation 4, i.e. blocks a part thereof, so that LED radiation 4 strikes only the region 6a of the incidence face 6, cf. FIG. 5A for illustration. The LED irradiation region 30a and the region 6a of the incidence face 6 are congruent in this operating state.

Figure 5B:
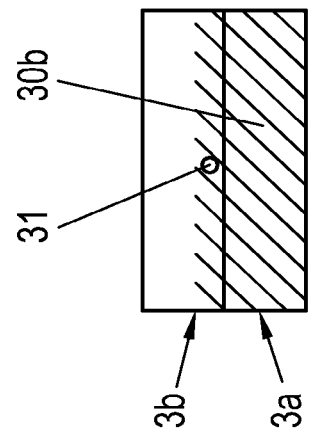
Figure 4B:
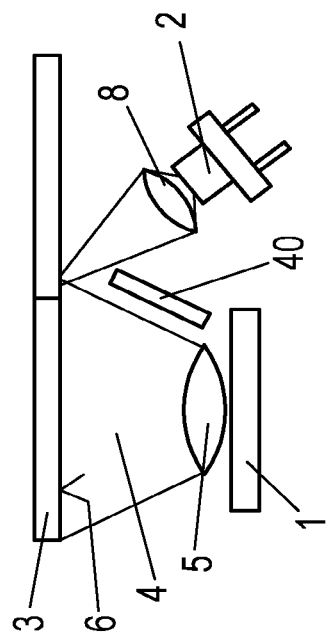

In the operating state according to FIG. 4B, the shutter 40 is tilted into an open position and correspondingly all of the LED radiation 4 strikes the incidence face 6, and specifically partly also in its region 6b (cf. FIG. 5B for illustration). The LED irradiation region 30 is thus variable in this embodiment, and in the operating state according to FIG. 4B/5B it corresponds to the LED irradiation area given as a time integral.

In addition to the increased LED irradiation region 30b, the laser 2 is also activated in the open position, i.e. a locally increased intensity is superimposed (see the description regarding FIGS. 1 and 2). In the open position, the shutter 40 also opens the path for the laser radiation 7, while in the closed position it blocks it (FIG. 4A). This may, for example, offer additional security and help to avoid unintended emergence of laser radiation 7 with a high power density.

In a motor vehicle headlamp, the operating state according to FIGS. 4A/5A (closed position) corresponds to a low-beam mode, and that according to FIGS. 4B/5B (open position) to a high-beam mode.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

LIST OF REFERENCES

LED 1
laser 2
luminescent element 3
regions of the luminescent element 3a,b
LED radiation 4
primary optics 5
incidence face 6
regions of the incidence face 6a,b
laser radiation 7
collimation lens 8
emission face 9
illumination light 10
illumination optics 11
steel plate 20
LED irradiation regions 30a,b
laser irradiation regions 31a,b
shutter 40

The invention claimed is:
1. An illumination device for emitting illumination light, comprising:
    a light-emitting diode (LED) for emitting LED radiation optically coupled to a first collimating optics,
    a laser for emitting laser radiation optically coupled to a second collimating optics, and
    a luminescent element for at least partial conversion of the LED radiation and the laser radiation into conversion light, which forms at least part of the illumination light,
    wherein the LED and the first collimating optics, the laser and the second collimating optics, and the luminescent element are arranged relative to one another in such a way that during operation of the illumination device, on an incidence face of the luminescent element, respectively in a time integral, the LED collimated through the first collimating optics irradiates an LED irradiation area with the LED radiation and the laser collimated through the second collimating optics irradiates a laser irradiation area with the laser radiation, wherein the laser irradiation area has at least one intersection with the LED irradiation area, the laser irradiation area being smaller than the LED irradiation area.

2. The illumination device as claimed in claim 1, wherein the laser irradiation area is a subset of the LED irradiation area.

3. The illumination device as claimed in claim 1, wherein the laser irradiation area has an area which constitutes at most 40% of an area of the LED irradiation area.

4. The illumination device as claimed in claim 1, wherein the LED irradiation area has an area which constitutes at least 40% of an area of the incidence face of the luminescent element.

5. The illumination device as claimed in claim 1, configured in such a way that, during operation of the illumination device, the incidence face of the luminescent element is at least temporarily irradiated simultaneously by the LED with the LED radiation and by the laser with the laser radiation.

6. The illumination device as claimed in claim 5, configured in such a way that, during the at least temporary simultaneous irradiation, a laser irradiation region irradiated by the laser with the laser radiation at a respective instant has at least one intersection with an LED irradiation region irradiated by the LED with the LED radiation at a respective instant.

7. The illumination device as claimed in claim 1, configured for operation in at least two operating states, wherein a laser irradiation region, irradiated with the laser radiation at a respective instant, of the incidence face of the luminescent element has a first area in a first of the operating states, and in a second of the operating states has a second area which is greater than the first area.

8. The illumination device as claimed in claim 7, wherein, in the at least two operating states, the laser and the incidence face of the luminescent element have a different distance relative to one another, wherein the laser radiation strikes the incidence face divergently or convergently so that the differently sized area is achieved.

9. The illumination device as claimed in claim 1, wherein a surface centroid of a laser irradiation region of the incidence face of the luminescent element, which laser irradiation region is irradiated with the laser radiation during operation of the illumination device at a respective instant, is positionally invariant.

10. The illumination device as claimed in claim 1, wherein the laser and the luminescent element are arranged relative to one another in such a way that the laser radiation strikes the incidence face of the luminescent element with a centroid direction which is tilted relative to a perpendicular to the incidence face.

11. The illumination device as claimed in claim 1, having a mechanically mobile shutter, wherein an LED irradiation region, irradiated during operation of the illumination device with the LED radiation at a respective instant, of the incidence face in a closed position of the shutter is partially masked by the latter and has a first area, and in an open position of the shutter has a second area which is greater than the first area.

12. The illumination device as claimed in claim 1, wherein the incidence face of the luminescent element is subdivided into a multiplicity of regions, which regions differ in their conversion properties.

13. A motor vehicle headlamp having an illumination device for emitting illumination light, the illumination device comprising:
a light-emitting diode (LED) for emitting LED radiation optically coupled to a first collimating optics,
a laser for emitting laser radiation optically coupled to a second collimating optics, and
a luminescent element for at least partial conversion of the LED radiation and the laser radiation into conversion light, which forms at least part of the illumination light,
wherein the LED and the first collimating optics, the laser and the second collimating optics, and the luminescent element are arranged relative to one another in such a way that during operation of the illumination device, on an incidence face of the luminescent element, respectively in a time integral, the LED collimated through the first collimating optics irradiates an LED irradiation area with the LED radiation and the laser collimated through the second collimating optics irradiates a laser irradiation area with the laser radiation,
wherein the laser irradiation area has at least one intersection with the LED irradiation area, the laser irradiation area being smaller than the LED irradiation area.

14. The motor vehicle headlamp as claimed in claim 13, configured in such a way that the LED irradiation area is irradiated with the LED radiation both in a low-beam mode of the motor vehicle headlamp and in a high-beam mode of the motor vehicle headlamp, wherein the laser irradiation area is additionally irradiated with the laser radiation in the high-beam mode.

15. The motor vehicle headlamp as claimed in claim 13, wherein the illumination device is configured for operation in at least two operating states, wherein a laser irradiation region, irradiated with the laser radiation at a respective instant, of the incidence face of the luminescent element has a first area in a first of the operating states, and in a second of the operating states has a second area which is greater than the first area, and is configured so that, in the first operating state, a high-beam mode of the motor vehicle headlamp is at least assisted and/or in the second operating state a daytime running mode of the motor vehicle headlamp is at least assisted.

16. The motor vehicle headlamp as claimed in claim 13, which has an illumination device having a mechanically mobile shutter, wherein an LED irradiation region, irradiated during operation of the illumination device with the LED radiation at a respective instant, of the incidence face in a closed position of the shutter is partially masked by the latter and has a first area, and in an open position of the shutter has a second area which is greater than the first area, and is configured so that the motor vehicle headlamp is switched into a low-beam mode in the closed position of the shutter and is switched into a high-beam mode in the open position of the shutter.

17. A method for use of an illumination device for a motor vehicle headlamp for emitting illumination light, comprising:
providing a light-emitting diode (LED) for emitting LED radiation,
optically coupling the LED to a first collimating optics,
providing a laser for emitting laser radiation,
optically coupling the laser to a second collimating optics,
providing a luminescent element for at least partial conversion of the LED radiation and the laser radiation into conversion light, forming at least part of the illumination light,
arranging the LED and the first collimating optics, the laser and the second collimating optics, and the luminescent element relative to one another, and
operating the illumination device such that on an incident face of the luminescent element, respectively in a time integral, the LED collimated by the first collimating optics is irradiating an LED irradiation area with the LED radiation and the laser collimated by the second collimating optics is irradiating a laser irradiation area with the laser radiation, wherein the laser irradiation area has at least one intersection with the LED irradiation area, the laser irradiation area being smaller than the LED irradiation area.

18. The illumination device as claimed in claim 1, wherein the laser irradiation area has a higher luminosity than the LED irradiation area.

19. The illumination device as claimed in claim 1, wherein the laser irradiation area is at least partially within the LED irradiation area.

20. The illumination device as claimed in claim 1, wherein the laser irradiation area and the LED irradiation area are on the same incidence face.

21. The illumination device as claimed in claim 13, wherein the laser irradiation area has a higher luminosity than the LED irradiation area.

22. The illumination device as claimed in claim 13, wherein the laser irradiation area is at least partially within the LED irradiation area.

23. The method of claim 17, wherein the laser irradiation area has a higher luminosity than the LED irradiation area.

24. The method of claim 17, wherein the laser irradiation area is at least partially within the LED irradiation area.

25. The method of claim 17, further comprising collimating the laser irradiation area and the LED irradiation area on the same incidence face.

\* \* \* \* \*